Patented Nov. 24, 1953

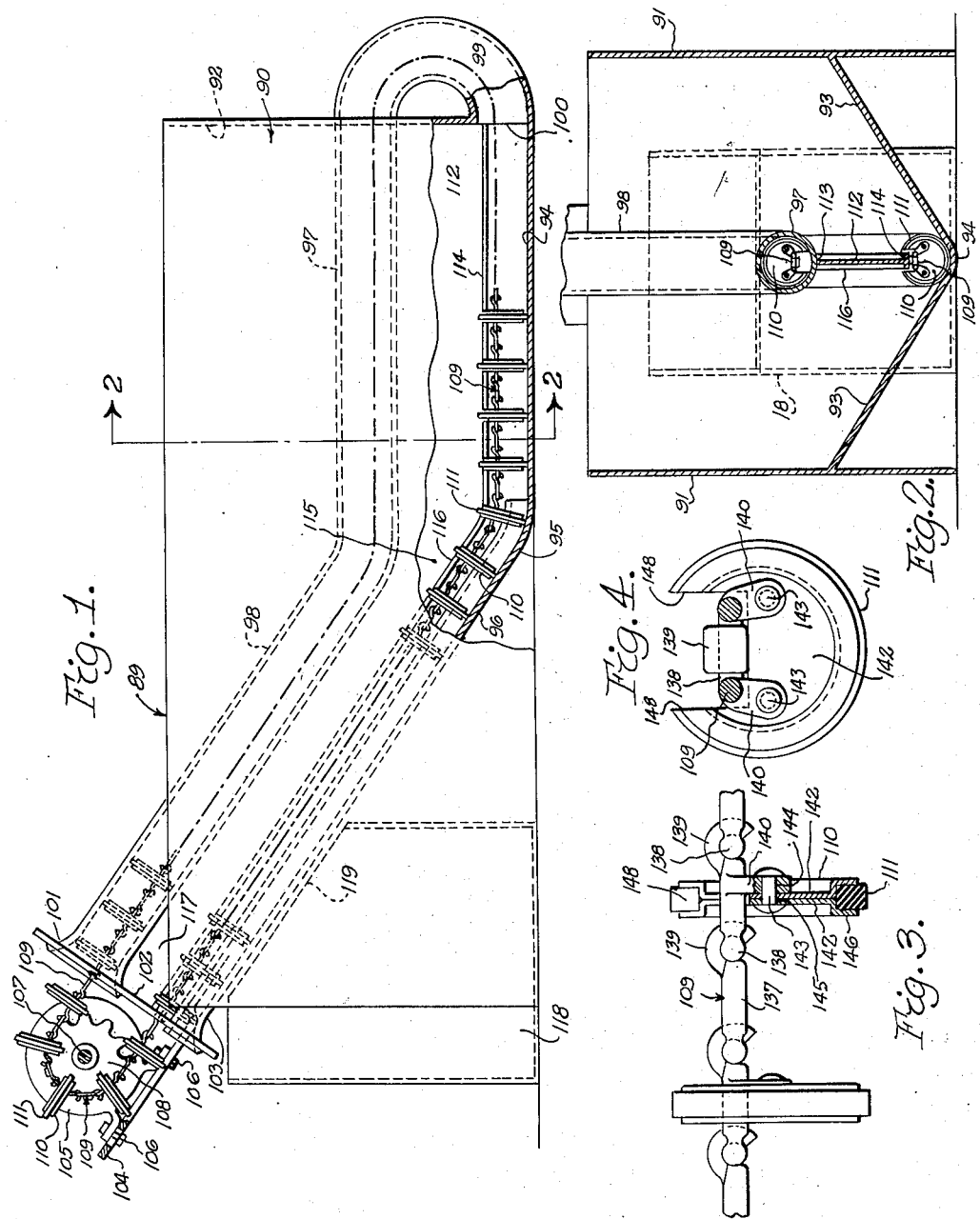

2,660,310

UNITED STATES PATENT OFFICE 2,660,310

SEDIMENT REMOVAL APPARATUS

Henry W. Hapman, Kalamazoo, Mich., assignor of forty per cent to Hannah Jane Hapman, Kalamazoo, Mich.

Original application October 12, 1944, Serial No. 558,424. Divided and this application November 15, 1950, Serial No. 195,848

2 Claims. (Cl. 210—55)

This invention relates to sludge or sediment removing apparatus and, in particular, to coolant tanks and the like.

One object of this invention is to provide a sediment removal apparatus including a flight conveyor which is adapted to operate in the V-bottom of a settling tank, the conveyor including a conduit system having forward and return portions arranged substantially in a vertical plane, the return portion traversing the lower portion of the tank.

Another object is to provide a sediment removal apparatus of the foregoing character wherein a part of the bottom of the tank is inclined upwardly so that a part of the return portion of the flight conveyor travels upwardly along this inclined part while removing the sediment from the bottom of the tank.

Another object is to provide a sediment removal apparatus of the foregoing character wherein the bottom of the tank itself forms a part of the return portion of the conduit system; the V-bottom portion serving as a trough in which the return course of the flight conveyor operates.

This is a division of my co-pending application Serial No. 558,424, filed October 12, 1944, now Patent No. 2,559,614, granted July 10, 1951.

In the drawings:

Figure 1 is a side elevation, partly in section, of a sediment removal apparatus according to one form of the invention;

Figure 2 is a vertical cross-section taken along the line 2—2 in Figure 1;

Figure 3 is a side elevation of one form of flight conveyor which may be employed in the sediment removal apparatus shown in Figure 1; and Figure 4 is a cross-section taken along the line 4—4 in Figure 3 through one of the links of the flight conveyor.

Referring to the drawings in detail, Figures 1 and 2 show a sediment removal apparatus according to one form of the invention generally designated 89 and including a coolant or settling tank 90 with a pair of side walls 91 connected at their rearward ends by an end wall 92. A pair of sloping bottom walls 93 connect the side walls 91 for a portion of their length and said sloping walls converge on a central trough 94 for receiving and facilitating the collection of sludge and sediment settling in the bottom of the tank. The sloping bottom walls 93 are bent at their point of convergence as at 95 to form sloping bottom walls arranged on an incline which converge in an inclined trough 96. The inclined sloping walls have their edges welded or otherwise secured to the side walls 91 of the tank as indicated in Figure 2.

Mounted within the coolant tank 90 is a conveyor conduit of tubular construction having a portion as at 97 extending parallel with the trough 94 and the remaining portion thereof inclined as at 98 and extending parallel to the trough formed by the point of convergence of the inclined sloping bottom walls 96. The relatively spaced and horizontal conveyor conduit portion 97 extends through an opening in the end wall 92 of the coolant tank 90 and is welded or otherwise secured thereto, to prevent the escape of liquid therebetween, and the end of said relatively horizontal conduit portion 97 projects externally of the coolant tank and is provided with a return bent portion 99 which has its end as at 100 received in an opening in the end wall 92 directly below the opening through which the relatively straight tubular conduit portion 97 projects. The end 100 of the return bent section 99 may be welded or otherwise affixed in place so as to register with the trough 94 of the converging sloping bottom walls 93. The upper end of the inclined tubular conduit portion 98 is provided with a flared mouth portion 101 and secured thereto by means of welding or the like is a supporting plate 102, which is also affixed to the projecting upper end portion 103 of the trough 96 formed by the inclined converging sloping bottom walls.

A motor supporting bracket 104 is adjustably secured to the coolant tank 90 for supporting an electric motor 105 which has its base adjustably secured to the supporting plate 104 by means of a slot and bolt connection 106. The armature shaft 107 of the motor 105 is provided with a sprocket wheel 108 over which is trained an endless sprocket chain 109. Conveyor flights 110 are mounted on the endless conveyor chain (Figures 3 and 4) and said flights 110 are constructed of opposed flight discs having interposed therebetween rubber wear members 111. Each of the conveyor flights 110 is cut away in the manner as shown in Figures 3 and 4.

It will thus be seen that the endless conveyor, including the endless sprocket chain 109 and spaced conveyor flights 110 will be guided through the conveyor conduit sections 97 and 98, as well as the return bent portion 99. In order to cause the lower course of said endless conveyor to travel in conformity to the troughs 94 and 96 formed by the sloping bottom walls of the coolant tank, a guide plate 112 has its upper edge welded as at 113 to the under side of the tubular conveyor conduit section 97 so as to depend therefrom, with the lower end provided with a guide strip 114 for being received in the cutaway portion of the conveyor flights 110 so as to engage the endless conveyor chain 109 and thereby hold the flights in position during their travel along the trough 94 formed by the inclined sloping bottom walls 93.

The guide strip 112 is provided with an angular portion 115 which is inclined upwardly and is welded to the bottom portion of the inclined conveyor tube section 98, and said inclined portion is provided with a flanged lower edge surface 116 continuous with the flanged portion 114 so as to guide the conveyor flights 110 during their travel along the inclined trough 96 formed by the inclined sloping bottom walls of the coolant tank. The upper end 117 of the inclined portion of the guide strip 115 is welded to the supporting plate 102, as well as being welded to the upper projecting end portion of the inclined section 98 of the conveyor tube conduit.

A collection chamber 118 is mounted between the side walls 91 of the coolant tank 90 to extend beneath the discharge portion 103 of the inclined trough 96, and said receptacle has its side walls inclined to permit the same to be positioned well within or between the side walls 91 of the coolant tank and conform to the sloping trough 96 of the converging inclined bottom walls of said tank. It will thus be seen that the coolant tank 90 may be placed under the discharge of the machine tool so as to collect the cooling liquid therefrom so that the same will be received in said tank and the heavier foreign particles therein will settle to the trough 94 and be carried or moved to the endless conveyor flights 110.

In the operation of the invention, the motor 105 is energized, rotating the shaft 107 and sprocket 108 and causing the sprocket chain or conveyor chain 109 to traverse the conduit 50. The upper or return course of the chain 109 passes downward through the pipe portions 98, 97 and 99 and through the aperture 100 and along the bottom portion or trough 94. As the flights 110 pass along the trough 94 they pick up the sediment which has settled downward in the tank 90 from the contaminated liquid which has been pumped into the tank 90. The flights 110 on the conveyor chain 109 then pass upward along the inclined trough 96 and emerge at the flared mouth portion 103, causing the sludge to be dumped into any suitable receptacle such as the collection chamber 118. The flights 110 on the conveyor chain 109 thus relieved of their loads of sediment, pass around the sprocket 108 and re-enter the flared entrance 101 of the return conduit pipe 98, repeating the cycle.

While the flight conveyor 109 is traversing the trough-like lower portion 94 of the tank 90, the flights 110 are held down by the guide strip 114 on the lower edge of the guide plate 112, and continue to be held down by the inclined guide strip 116 which is continuous with the guide portion 114, as stated above. In this manner, the conveyor flights 110 are also held down while they traverse the upwardly inclined trough 96 leading to the flared discharge end 103 of the conduit system.

The flight conveyor chain 109 is composed of a series of chain links 137 having one end formed with a bar portion 138 and the opposite end provided with a hooked portion 139 for receiving the bar portion 138 (Figures 3 and 4) so that the space between the chain links 137 will provide a sprocket tooth receiving opening of a slightly larger size than the teeth on the sprocket wheel 108. Alternate chain links 137 are provided with laterally extending arm portions 140 (Figures 3 and 4) which arm portions may be formed integral with the chain links or may be attached thereto in any suitable manner. Secured to the laterally extending arm or wing portions 140 of the chain links 137 is the previously-mentioned series of conveyor flights 110. Each conveyor flight 110 is formed of a pair of pressed metal stampings 142 which are adapted to be secured together and to the laterally extending wing portions 140 by rivets 143 or the like passed through suitable openings 144 in the laterally extending wing portions 140 which are aligned with openings 145 in the pressed metal stampings 142. The peripheral edge of each stamping 142 is flanged as at 146 to provide a space therebetween for receiving the previously-mentioned natural or synthetic rubber insert 111 which is adapted to withstand considerable wear during the handling of abrasive material or particles deposited in the cooling liquid. Each of the conveyor flights 110 is cut away as at 148 to form a recess or passageway for permitting the travel of said flights over the sprocket wheel 108 during their passage thereabout.

What I claim is:

1. A sediment removal apparatus comprising a horizontally-elongated tank having side and end walls and converging sloping bottom walls connected thereto and forming an elongated substantially horizontal trough at the junction of said bottom walls, a conveyor conduit structure disposed in said tank in an approximately vertical plane passing through and including the longitudinal axis of said trough, said conduit structure including a return pipe spaced above said trough and a connecting pipe extending from said return pipe to said trough, an endless flight conveyor trained through said conduit structure and extending upwardly out of said tank, said conveyor having a substantially horizontal lower course passing through and along said trough, a conveyor driving wheel mounted above said tank and drivingly engaging said conveyor, and a motor drivingly connected to said driving wheel, said conduit structure including an elongated substantially horizontal guide member disposed above said trough in spaced parallel relationship therewith and guidingly engaging the upper side of said lower course of said flight conveyor.

2. A sediment removal apparatus comprising a horizontally-elongated tank having side and end walls and converging sloping bottom walls connected thereto and forming an elongated substantially horizontal trough at the junction of said bottom walls, said converging bottom walls having portions thereof inclined upwardly forming an upwardly-inclined extension of said elongated horizontal trough, a conveyor conduit structure disposed in said tank in an approximately vertical plane passing through and including the longitudinal axis of said trough, said conduit structure including a return pipe spaced above said trough and a connecting pipe extending from said return pipe to said trough, an endless flight conveyor trained through said conduit structure and extending upwardly out of said tank, said conveyor having a partly horizontal and partly inclined lower course passing through and along said horizontal trough and said inclined trough extension, a conveyor driving wheel mounted above said tank and drivingly engaging said conveyor, and a motor drivingly connected to said driving wheel, said conduit structure including an elongated partly horizontal and partly inclined guide member disposed above said trough and trough extension respectively in spaced parallel relationship therewith and guidingly engaging the upper side of said lower course of said flight conveyor.

HENRY W. HAPMAN.

References Cited in the file of this patent

UNITED STATES PATENTS

| Number | Name | Date |
|---|---|---|
| 602,515 | McClatchey et al. | Apr. 19, 1898 |
| 2,432,756 | Hapman | Dec. 16, 1947 |
| 2,559,614 | Hapman | July 10, 1951 |

FOREIGN PATENTS

| Number | Country | Date |
|---|---|---|
| 343,025 | Germany | Oct. 27, 1921 |
| 531,865 | Germany | Aug. 19, 1931 |